(12) United States Patent
Ikeda et al.

(10) Patent No.: US 9,923,495 B2
(45) Date of Patent: Mar. 20, 2018

(54) MOTOR CONTROL DEVICE

(71) Applicant: MITSUBA Corporation, Kiryu-shi, Gunma-ken (JP)

(72) Inventors: Takayuki Ikeda, Kiryu (JP); Akira Kadoya, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 15/297,842

(22) Filed: Oct. 19, 2016

(65) Prior Publication Data

US 2017/0117832 A1     Apr. 27, 2017

(30) Foreign Application Priority Data

Oct. 23, 2015   (JP) ................. 2015-209202

(51) Int. Cl.
| | |
|---|---|
| *E05F 15/00* | (2015.01) |
| *H02P 6/16* | (2016.01) |
| *H02K 11/215* | (2016.01) |
| *H02K 1/24* | (2006.01) |
| *H02P 27/08* | (2006.01) |
| *H02P 3/14* | (2006.01) |
| *E05F 15/646* | (2015.01) |

(52) U.S. Cl.
CPC ............ *H02P 6/16* (2013.01); *E05F 15/00* (2013.01); *E05F 15/646* (2015.01); *H02K 1/24* (2013.01); *H02K 11/215* (2016.01); *H02P 3/14* (2013.01); *H02P 27/08* (2013.01); *E05Y 2400/302* (2013.01); *E05Y 2400/40* (2013.01)

(58) Field of Classification Search
CPC ......... E05F 15/00; H02K 11/215; H02K 1/24; H02P 6/16
See application file for complete search history.

(56) References Cited

U.S. PATENT DOCUMENTS

| | | | | |
|---|---|---|---|---|
| 6,657,409 B1* | 12/2003 | Leivenzon | ................ | E06B 9/80 318/286 |
| 2009/0289486 A1* | 11/2009 | Jimenez Pino | ...... | B60N 2/0232 297/344.1 |
| 2015/0096233 A1* | 4/2015 | Kojima | ..................... | H02P 3/14 49/31 |

FOREIGN PATENT DOCUMENTS

JP   2001-280002 A   10/2001

OTHER PUBLICATIONS

MITSUBA Corporation, Certificate for Purpose of Seeking Application of Exceptions to Lack of Novelty of Invention, dated Nov. 18, 2015, 4 pages.
MITSUBA Corporation, Document to be submitted for the certificate for the application of Exception to Lack of Novelty, dated Nov. 20, 2015, 2 pages.

* cited by examiner

*Primary Examiner* — Shawki S Ismail
*Assistant Examiner* — Muhammad S Islam
(74) *Attorney, Agent, or Firm* — Wood Herron & Evans LLP

(57) ABSTRACT

A motor control device to control rotation of an electric motor configured to conduct opening/closing of an opening/closing body provided in a vehicle includes a control unit configured to generate a regenerating brake force to the electric motor until a predetermined time passes, in a case where it is determined that the opening/closing body reaches a full open position.

3 Claims, 5 Drawing Sheets

VEHICLE FRONT DIRECTION ←→ VEHICLE REAR DIRECTION

MOTOR CONTROL DEVICE

CROSS-REFERENCE TO RELATED APPLICATIONS

Priority is claimed on Japanese Patent Application No. 2015-209202, filed on Oct. 23, 2015, the contents of which are incorporated herein by reference.

BACKGROUND

Field of the Invention

The present invention relates to a motor control device of an electric motor to drive an opening/closing body.

Background

In the related art, a motor control device to drive such opening/closing bodies as a sliding door or a rear door provided in an automobile by an electric motor is configured to actuate the sliding door in both opening/closing directions by rotational control of the electric motor in both forward/reverse directions (refer to Japanese Patent Application, Publication No. 2001-280002). Specifically, the sliding door connected to a cable is actuated in both opening/closing directions by pulling the cable by the electric motor. In this way, the sliding door is capable of traveling within a range from a full close position for closing up a door opening to a full open position for opening up the door opening at a maximum.

In the motor control device of the related art, rotational operation of the motor is stopped upon detecting that a stopper provided in the full open position of the sliding door abuts with the sliding door during opening operation of the sliding door. In this way, it is possible to conduct opening operation of the sliding door until the full open position. And a full open lock mechanism for retaining the sliding door near the full open position is provided at a guide rail configured to guide a traveling direction of the sliding door. The sliding door is configured to be retained near the full open position by the actuation of the full open lock mechanism.

SUMMARY

However, a position where the sliding door is retained by the full open lock mechanism and a position where the sliding door abuts the stopper are not identical, but a certain distance exists therebetween. Therefore, when the motor control device stops current supply to the motor upon detecting that the sliding door abuts with the stopper, the sliding door is returned to a closing direction with momentum by a cable tension or the like, which may possibly cause the sliding door vibrate and rattle within the range of the above-described distance.

An aspect of the present invention is to provide a motor control device to reduce a undesired action of a sliding door such as rattling of a sliding door generated after the sliding door reaches a full open position.

An aspect of the present invention is a motor control device to control rotation of an electric motor configured to conduct opening/closing of an opening/closing body provided in a vehicle, the motor control device including: a control unit configured to generate a regenerating brake force to the electric motor until a predetermined time passes, in a case where it is determined that the opening/closing body reaches a full open position.

Another aspect of the present invention is the motor further including: a full open position determination unit configured to determine whether or not the opening/closing body reaches the full open position based on pulse signal output from a rotation angle sensor in accordance with rotation of the electric motor.

Another aspect of the present invention is the motor wherein the full open position determination unit is configured to determine that the opening/closing body reaches the full open position in a case where the pulse signal is equal or exceed a first threshold value.

Another aspect of the present invention is the motor wherein the full open position determination unit is configured to determine that the opening/closing body reaches the full open position in a case where the pulse signal is equal or exceed a first threshold value, and a current value of a current which flows in the electric motor is equal or exceed a second threshold value.

Another aspect of the present invention is the motor wherein the full open position determination unit is configured to determine that the opening/closing body reaches the full open position in a case where a traveling speed of the opening/closing body calculated based on the pulse signal is less than a third threshold value.

According to an aspect of the present invention, it is possible to provide a motor control device to reduce rattling of a sliding door generated after the sliding door reaches a full open position.

DESCRIPTION OF THE EMBODIMENTS

Figure 1:
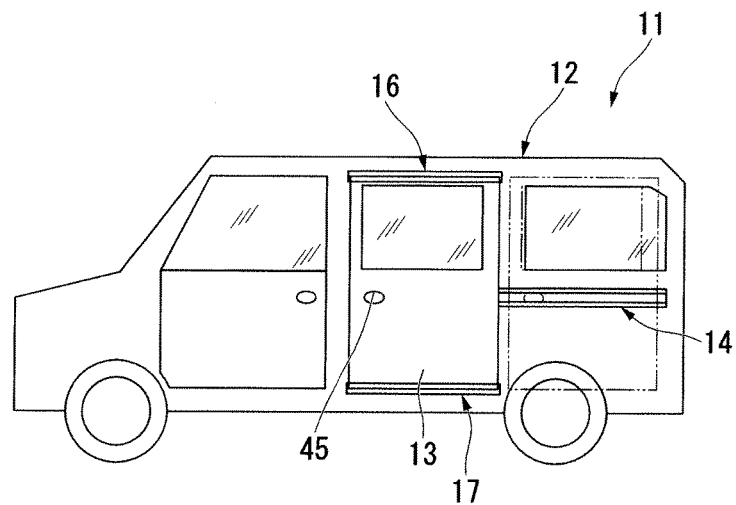
FIG. 1 is a side view of a vehicle of minivan type having a vehicular opening/closing device including motor control device according to an embodiment.

Hereinafter, an aspect of the present invention will be described through an aspect of the present embodiment, though the scope of the claimed inventions is not limited to the below-described embodiment. And not all of combinations of the features described in below embodiment are always necessary to the means for solving problem. In addition, identical or similar portion may be marked with the same number in the drawings, and redundant explanation maybe omitted.

A motor control device of the present embodiment is a motor control device to control rotation of an electric motor configured to conduct opening/closing of an opening/closing body (a sliding door, for example) provided in a vehicle, which is configured to generate a regenerating brake force to the electric motor until a predetermined time passes, in a case where it is determined that the opening/closing body reaches a full open position.

Below the motor control device of the present embodiment will be described.

Referring to the drawings, a vehicular opening a vehicular opening/closing device 10 of the present embodiment will be described below. FIG. 1 is a side view of a vehicle of minivan type having a vehicular opening/closing device 10 including a motor control device 41 according to the aspect of the present embodiment.

Figure 2:
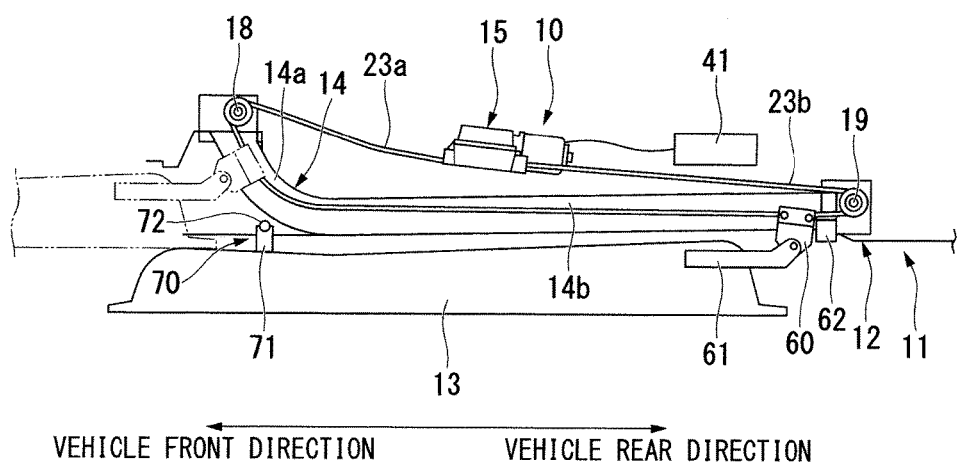
FIG. 2 is a top view of a sliding door, and is a magnified view indicating details of mounting portion of the sliding door according to the present embodiment.

FIG. 2 is a top view of a sliding door 13, and is a magnified view indicating details of mounting portion of the sliding door 13 according to the present embodiment.

As shown in FIG. 1 and FIG. 2, a vehicle 11 includes sliding door 13, guide rail 14, 16, 17 and the vehicular opening/closing device 10.

As shown in FIG. 1, the vehicle 11 is a vehicle of minivan type, provided with the sliding door 13 which is the opening/closing body at side portion of a vehicle body 12 of the vehicle 11. The sliding door 13 is capable of opening/closing between a full close position indicated by a full line and a full open position indicated by a dotted line FIG. 1, guided by a guide rail 14 (guiding member) fixed to the side portion of the vehicle body 12. Thus, the sliding door is used by being opened to a desired opening degree when boarding/disembarking of a passenger or loading/unloading a luggage. Also, sliding door 13 is provided with a handgrip 45 as an opening/closing switch for instructing an opening/closing operation of the sliding door 13.

As shown in FIG. 2, an arm 61 projecting backward of the vehicle 11 is fixed to the sliding door 13, and at the leading end of the arm 61, a roller assembly 60 is swingably attached at the leading end of the arm 61. The roller assembly 60 is embedded in the guide rail 14 fixed to the side portion of the vehicle 11, and is capable of traveling along the guide rail 14 in a forward/backward direction of the vehicle 11. Also, stopper rubber 62 is provided at the rear end of the guide rail 14 in the vehicle traveling direction. The roller assembly 60 is configured to be restricted from traveling by abutting with the stopper rubber 62. In the structure as described above, the sliding door 13 is configured to be travelable, that is, capable of opening/closing between the full close position indicated by the full line and the full open position indicated by the dotted line along a side surface of the vehicle 11 in the forward/backward direction of the vehicle 11. In the present embodiment, when the roller assembly 60 abuts with the stopper rubber 62, the sliding door 13 reaches the full open position.

The sliding door 13 travels in the forward/backward direction of the vehicle 11 as the roller assembly 60 is guided by the guide rail 14.

The guide rail 14 includes a curve part 14a, a liner part 14b, a reverse pulley 18 and a reverse pulley 19. The curve part 14a is formed on the forward side of guide rail 14a in the vehicle traveling direction. The curve part 14a has a curved shape towards the vehicle interior. The sliding door 13 is closed in a state of being pulled inward of the vehicle body 12 so as to be accommodated in the same plane as the side surface of the vehicle body 12, by the roller assembly 60 guided by the curve part 14a. The linear part 14b is formed in a rear position in the vehicle traveling direction, compared to the curve part 14a. The linear part 14b has a shape which is parallel with respect to the side portion of the vehicle 12. In addition to the roller assembly 60 indicated FIG. 2, roller assemblies 60 are also provided in upper and lower front end portion of the sliding door 13 (an upper part, a lower part) respectively. As shown in FIG. 1, guide rail 16 and guide rail 17, corresponding to the roller assemblies 60 provided in upper and lower front end portion of the sliding door 13 (an upper part, a lower part), are provided at upper and lower front end portion of the opening of the vehicle body 12. Thus, the sliding door 13 is supported at totally three portions to the vehicle body 12. The reverse pulley 18 and the reverse pulley 19 are respectively provided at the both ends of the guide rail 14.

A vehicular opening/closing device 10 is a device for opening/closing the sliding door 13 automatically. The vehicular opening/closing device 10 includes a drive unit 15 and a cable 23 (cable 23a, cable 23b). The drive unit 15 is disposed inside the vehicle body 12, adjacent approximately to a center potion in the vehicle traveling direction of the guide rail 14. The cable 23a and cable 23b are respectively connected from the front side and the rear side in the vehicle traveling direction to the roller assembly 60. When the drive unit 15 pulls either one out of the cable 12a and the cable 23b, an opening operation or a closing operation of the sliding door is conducted.

A full open lock mechanism 70 as a retaining mechanism of an open status is provided in the sliding door 13 for retaining the sliding door at a predetermined open position, that is, the full open lock position. The full open lock mechanism 70 includes a hook arm 71 swingably attached to the vehicle body 12 in a standing state and an inclined state with respect to the vehicle body 12, and a striker 72, which is stick-like, fixed to the vehicle body 12 at the rear side of the opening of the vehicle body 12 in the traveling direction of the vehicle. When the sliding door 13 is opened until a position in the vicinity of the full open position ("a full open lock position" described below), the striker 72 engages with an engagement groove provided at a leading end of the hook arm 71. However, even after the engagement is occurred, the sliding door 13 is configured to swing until the full open position. That is to say, even after the striker 72 engages with the groove provided at the leading end of the hook arm 71, the sliding door 13 continues traveling in an opening direction. And when the sliding door 13 abuts with the stopper rubber 62 provided in the vehicle 11, it is determined that the sliding door 13 reaches the full open position. The position where the sliding door 13 is retained by engaging with the striker 72 is called a full lock open position. Thus, the sliding door 13 once opened until the full open position is retained in the full open lock position which is the position in the vicinity of the full open position by the engagement of the hook arm 71 and the striker 72. And the sliding door 13 is configured to be restricted from swinging towards the front of the vehicle. In addition, the full open lock position where the sliding door 13 is retained by the full open lock mechanism 70 and the position where the sliding door 13 abuts with the stopper rubber 62 (the full open position) are not identical, but a certain distance exist therebetween.

Figure 3:
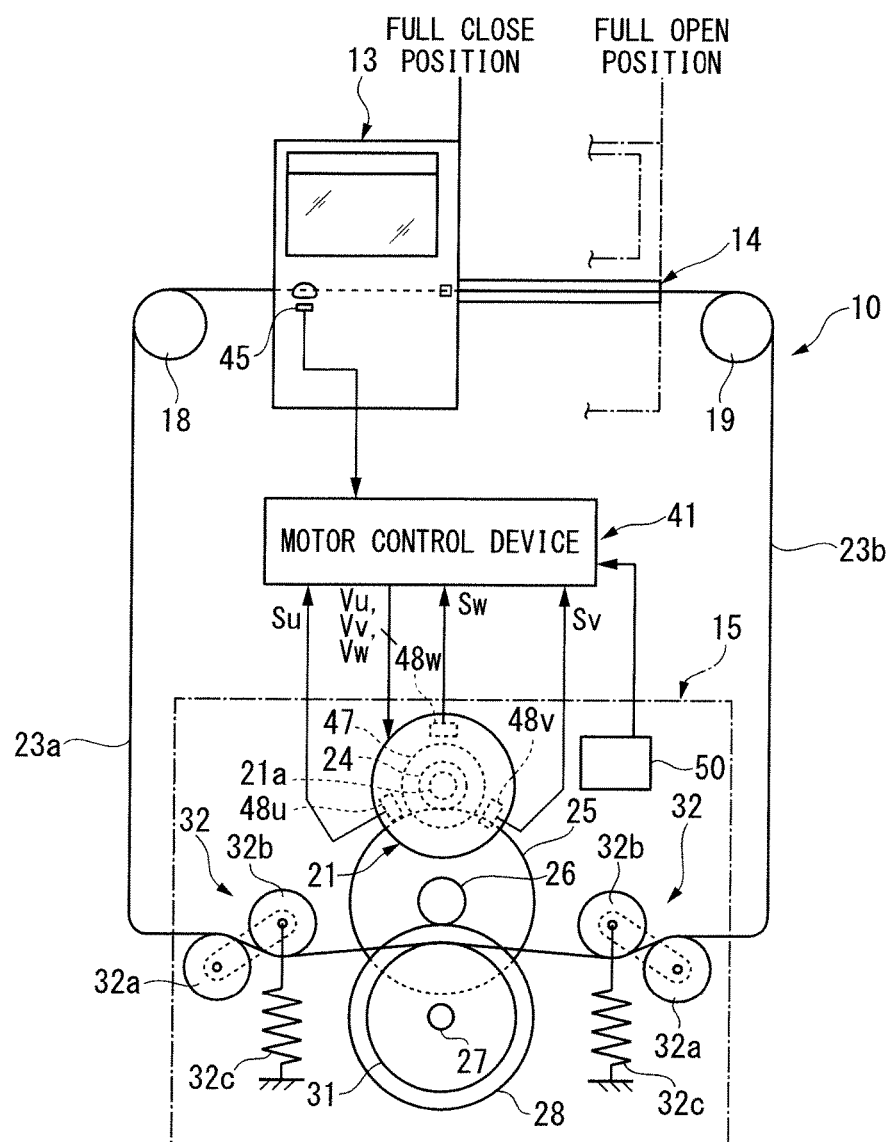
FIG. 3 is an exemplary diagram indicating a configuration outline of the vehicular opening/closing device in a control system according to the present embodiment.

FIG. 3 is an exemplary diagram indicating a configuration outline of the vehicular opening/closing device 10 in a control system according to the present embodiment. The vehicular opening/closing device 10 includes a drive unit 15, a rotation angle sensor 48, a measurement unit 50 and a motor control device 41. The electric motor 21 is a power source for driving the sliding door 13 open/close. For example, the electric power motor 21 is a motor rotatable in both forward/reverse directions such as a 3-phase (U-phase, V-phase and W-phase) brushless motor. The electric motor 21 is driven and rotate based on drive signal supplied from the motor control device 41. That is, the electric power motor 21 is actuated when an applied voltage Vu, an applied voltage Vv and an applied voltage Vw are supplied respectively to each phase of the three phases following the energization pattern from the motor control device 41. The direction of rotation of the electric motor 21 is switched to either forward rotation or reverse rotation according to polarity (positive or negative) of the applied voltage.

A rotor 47 (a permanent magnet) is fixed to a rotational shaft 21a of the electric motor 21. In the vicinity of a rotational track of the rotational shaft 47, three Hall ICs (Hall IC 48u, Hall IC 48v and Hall IC 48w) are provided as a rotation angle sensor 48 for detecting rotational position of the rotational shaft 47, being spaced 120 degree from each other, around the rotational shaft 21a as a center. When the rotational shaft 21 of the electric motor 21 is rotated, these three Hall ICs (Hall IC 48u, Hall IC 48v and Hall IC 48w) respectively output pulse signal Su, pulse signal Sv and pulse signal Sw to the motor control device 41, a phase of each pulse signal being shifted by 120 degree from each other. That is to say, the rotation angle sensor 48 outputs pulse signal in accordance with rotation of the electric motor 21 to the motor control device 41.

A drive gear 24 is fixed to the rotational shaft 21 of the electric motor 21. The drive gear 24 is meshed with a large diameter spur gear 25. A small diameter spur gear 26 which integrally rotate with the large diameter spur gear 25 is meshed with a driven gear 28 fixed to an output shaft 27. In the configuration as described above, the rotation of the electric motor 21 is reduced at a predetermined speed reduction ratio and transmitted to the output shaft 27.

A cylindrical shaped drum 31 with a spiral guide groove (not shown in diagrams) formed on an outer circumferential surface is fixed to the output shaft 27. The cable 23 guided by the drive unit 15 is wound multiple times around the drum 31 along the guide groove. As the electric motor 21 is actuated, the drum 31 is driven by the electric motor 21 and rotated, and thus, the cable 23 is actuated and opening/closing operations of the sliding door 13 is conducted. That is to say, through rotating the drum 31 in the counterclockwise direction in FIG. 3 by the electric motor, the cable 23 of the rear side in the vehicle traveling direction is wound up. And the sliding door 31 travels in the opening direction, being pulled by the cable 23. On the contrary, through rotating the drum 31 in the clockwise direction in FIG. 3 by the electric motor, the cable 23 of the front side in the vehicle traveling direction is wound up. And the sliding door 13 travels in the closing direction, being pulled by the cable 23. In this way, the sliding door 13 is connected to the electric motor 21 via the cable 23, drum 31, the output shaft 27, etc. and is configured to be driven open/close by the electric motor 21.

A tensioner 32 is respectively provided in a place between the drum 31 and both of the reverse pulley 18 and the reverse pulley 19. The tensioner 32 maintains cable tension within a certain range by preventing the cable 23 between the drum 31 and the sliding door 13 from loosening. Each of the tensioner 32 includes a fixed pulley 32a and movable pulley 32 respectively. The movable pulley 32b is pressed by a spring member 32c in rotational direction about an axis of the fixed pulley 32a as an axial center. The cable 23 is set between each of the fixed pulleys 32a and the movable pulleys 32b. Therefore, when the cable 23 is loosen, the movable pulley 32b presses against the cable 23 to make the traveling path of the cable 23 longer, and accordingly the tension of the cable 23 is maintained.

The drive unit 15 is configured to be a non-clutch type which is not provided with a clutch mechanism between the electric motor 21 and the output shaft 27. That is to say, driving force is always transmissible from the electric motor 21 to the output shaft 27, that is, the sliding door 13.

As there is an air gap between a stator of the electric motor 21 and the rotor 47 (magnet rotor) connected to the drum 31, there is no direct mechanical contact therebetween. Accordingly, vibration caused when regenerating brake force is generated by the electric motor 21 as described below is smaller than vibration (shock) caused by on-off control of clutch mechanism. However, the drive unit 15 of the present embodiment may be configured to include a clutch.

The electric motor 21 of the drive unit 15 is driven by the motor control device 41. The motor control device 41 controls actuation of the electric motor 21 so that the sliding door 13 travels by opening/closing at a preset target speed. Additionally, the motor control device 41 generates the regenerating brake force by short-circuiting the input terminal 22u, input terminal 22v and input terminal 22w of the electric motor 21.

On both of the vehicle interior side and outside of the sliding door 13, the handgrip 45 with an opening/closing switch function is provided respectively. The handgrip 45 is connected to the motor control device 41. The handgrip 45 outputs opening/closing instruction signal according to the operation by a passenger or the like to the motor control device 41. That is to say, the handgrip 45 outputs an instruction signal to open the sliding door 13 to the motor control device 41 when operated toward an opening side by an operator such as a passenger or the like. The handgrip 45 outputs an instruction signal to close the sliding door 13 to the motor control device 41 when operated toward an closing side by an operator such as a passenger or the like. Upon receiving the opening/closing instruction signal supplied from the handgrip 45, the motor control device 41 goes into forward rotation or reverse rotation control of the electric motor 21 based on the opening/closing instruction signal. In this way, the motor control device 41 enables the sliding door 13 actuated in the opening direction or in the closing direction. That is to say, the operator is enabled to conduct the opening/closing operation of the sliding door automatically by operating the handgrip 45.

The measurement unit 50 is connected to the motor control device 41. The measurement unit 50 measures a current value (hereinafter referred to as "motor current value") I of a current flow in the electric motor 21. The measurement unit 50 outputs the measured motor current value I to the motor control device 41. For example, the measurement unit 50 measures the motor current value I by every certain cycle in case when the handgrip 45 is operated by an operator such as a passenger or the like and the electric motor 21 is driven. Then, the measurement unit 50 outputs the measured motor current value I to the motor control device 41.

Figure 4:
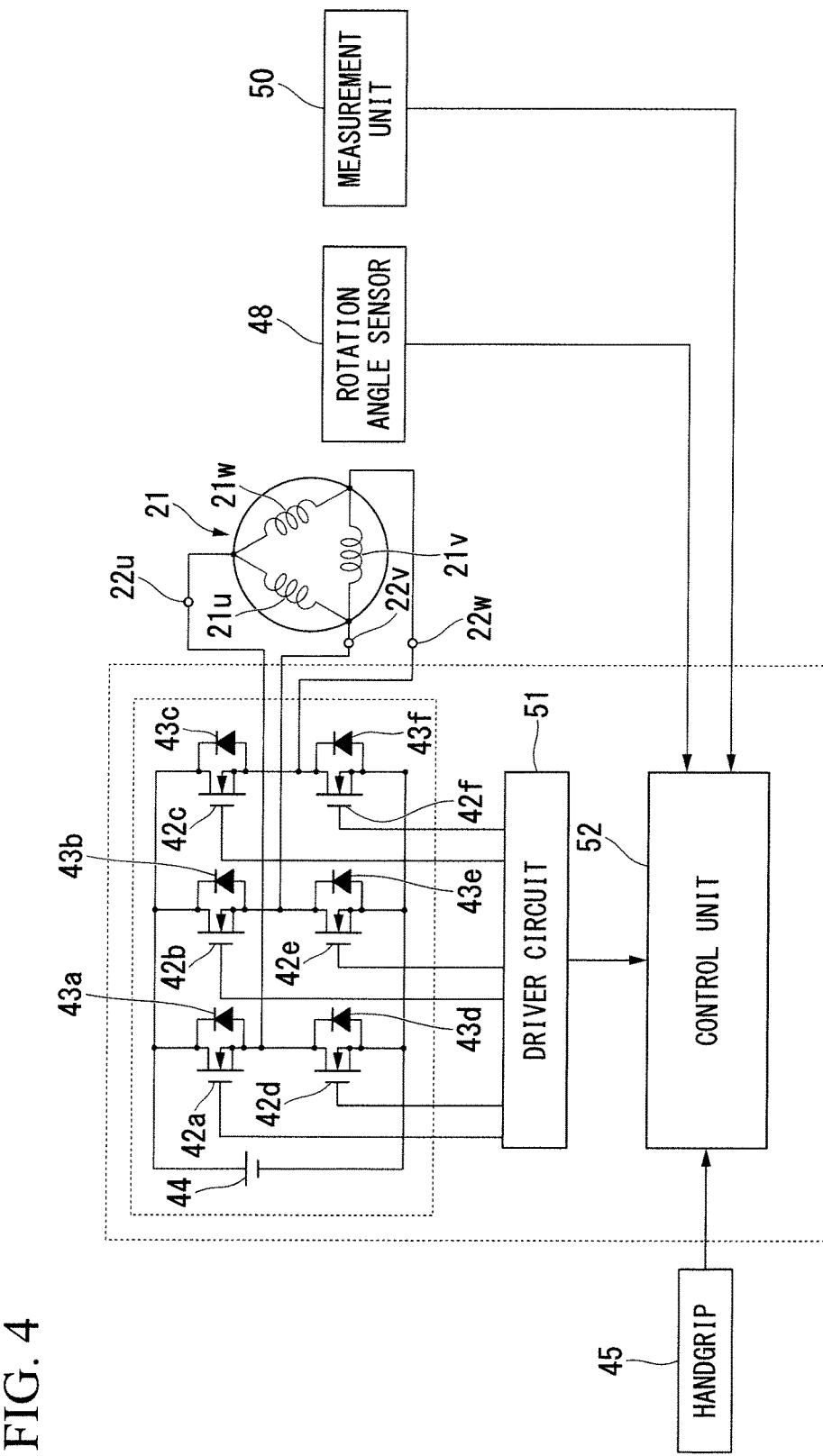
FIG. 4 is an exemplary diagram indicating a configuration outline of a motor control device in the control system according to the present embodiment.

FIG. 4 is an exemplary diagram indicating a configuration outline of the motor control device 41 in the control system according to the aspect of the present embodiment. The motor control device 41 includes a drive circuit unit 42, driver circuit 51 and control unit 52.

The drive circuit unit 42 includes six switching elements 42a to 42f connected in a form of 3-phase bridge, and diodes 43a to 43f connected in antiparallel between a collector and an emitter of each of the switching elements 42a to 42f. Each of the switching elements 42a to 42f is, for example FET (Field Effect Transistor) or IGBT (Insulated Gate Bipolar Transistor). Each gate of the six switching elements 42a to 42f connected in bridge is connected to the driver circuit 51.

The collector or the emitter of the switching element 42a to 42f is connected via the input terminals 22u, 22v and 22w of the electric motor 21 to rotor coil 21u, 21v and 21w in the delta connection, for example. In this way, six switching elements 42a to 42f conduct switching operation by drive signal (gate signal) G1 to G6 input from the driver circuit 51. And, the switching elements 42a to 42f supply a source voltage of a direct current power source 44 applied to the drive circuit 42 as 3 phase (U-phase, V-phase and W-phase) applied voltage Vu, Vv and Vw to the stator coil 21u, 21v and 21w.

Based on the PWM instruction signal supplied from the control unit 52, the driver circuit 51 generates the drive signal G1 to G6 for switching the switching elements 42a to 42f alternately, and outputs to the drive circuit unit 42. In this way, the drive circuit unit 42 applies the energization pattern of the supply voltage Vu, Vv and Vw for alternately energizing the rotor coil 21u 21v and 21w, causing the rotational shaft 47 rotated in a rotational direction instructed by the control unit 52.

The control unit 52 outputs a PWM instruction signal for instructing forward rotation or reverse rotation of the electric motor 21 based on the instruction signal supplied from the handgrip 45. In addition, the control unit 52 generates a regenerating brake force to the electric motor 21 until a predetermined time T passes when the control unit 52 detects that the sliding door 13 reaches the full open position. For example, the predetermined time T is approximately one second. The control unit 52 stops generating the regenerating brake force after generating the regenerating brake force for the predetermined time T to the electric motor 21. This is for reducing the rattling occurred after the sliding door 13 reaches the full open position. That is to say, from when the sliding door 13 abuts with the stopper rubber 62 until the driving of the electric motor 21 is stopped, there need to be a certain extent of time. Therefore, an opening operation of the sliding door is to continue for a certain time in a state where the sliding door 13 abuts with the stopper rubber 62. And, when the state where the sliding door 13 abuts with the stopper rubber 62 continues, a force for the sliding door 13 to travel in the closing direction (hereinafter referred to as "repelling force") will be applied to the sliding door 13 by the tension from the tensioner 32 against the cable 23 or elastic deformation of the stopper rubber 62 or the like. Accordingly, when it is detected that the sliding door 13 reaches the full open position and the driving of the electric motor 21 is turned off, the electric motor 21 transfers into a free state. And, the sliding door 13 travels forward in the vehicle traveling direction (in the closing direction) with a momentum. However, the sliding door 13 is retained by the full open lock mechanism 70 in the full open lock position, rattling of the sliding door 13 may possibly occur between the full open position and the full open lock position.

In the present embodiment, however, when the control unit 52 detects that the sliding door 13 reaches the full open position, the repelling force to the sliding door 13 by the tension from the tensioner 32 against the cable 23 or elastic deformation of the stopper rubber 62 or the like is weakened by generating the regenerating brake force for the predetermined time T. In this way, it is possible to reduce rattling of the sliding door 13 and cause the sliding door 13 stops.

Figure 5:
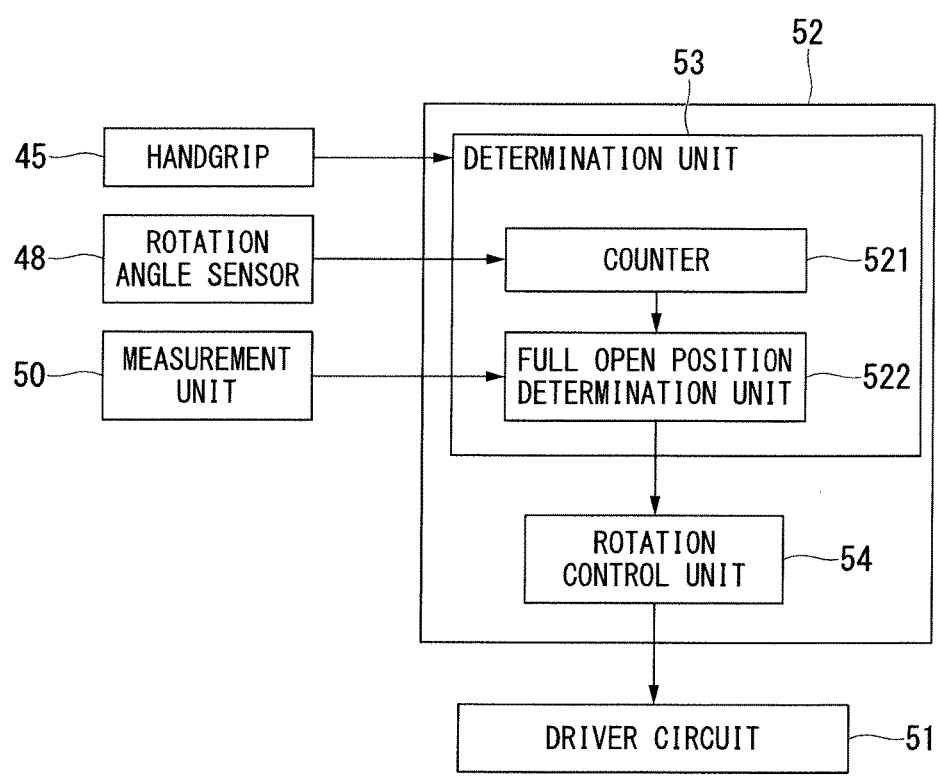
FIG. 5 is an exemplary diagram indicating a configuration outline of regeneration control of a control unit according to the present embodiment.

Hereinafter, regeneration control of the present embodiment will be described. FIG. 5 is an exemplary diagram indicating a configuration outline of the regeneration control of the control unit 52 according to the present embodiment.

The control unit 52 includes a determination unit 53 and a rotation control unit 54.

The determination unit 53 determines whether or not the sliding door 13 reaches the full open position.

The determination unit 53 includes a counter 521 and a full open position determination unit 522.

The counter counts a number of pulse signal supplied from the rotation angle sensor 48 when opening/closing operation of the sliding door is started (or when the pulse signal appears) based on an instruction signal supplied from the handgrip 45. For example, with reference to a predetermined position of the sliding door 13 (for example, the full close position), the counter 521 increments a count value N each time the pulse signal is obtained. Thus, the control unit 52 detects the position of the sliding door 13 based on the count value N. In the present embodiment, a case where a user conducts the opening operation to the handgrip 45 will be described.

The full open position determination unit 522 determines that the sliding door 13 reaches the full open position in a case where the count value N of the counter 521 is equal or exceed a threshold value Nth (a first threshold), and the motor current value I the measurement unit 50 measured is equal or exceed a threshold value Ith (a second threshold value). The threshold value Nth is a value of the count value N when the sliding door reaches the full open position. The threshold value Ith is a motor current value I when the sliding door abuts with the stopper rubber 62. When the sliding door 13 abuts with the stopper rubber 62, load to the electric motor 21 is increased, and the motor current value I is larger. Therefore, the full open position determination unit 522 is able to determine that the sliding door abuts with the stopper rubber 62, that is, the sliding door 13 reaches the full open position based on the motor current value I the measurement unit 50 measured. In the present embodiment, the full open position determination unit 522 determines that the sliding door 13 reaches the full open position in a case where the count value N of the counter 521 is equal or exceed a threshold value Nth, and the motor current value I the measurement unit 50 measured is equal or exceed a threshold value Ith, but not limited to what is described above. For example, the full open position determination unit 522 may determine that the sliding door 13 reaches the full open position, in either one of the cases is fulfilled, the case in which the count value N of the counter 521 is equal or exceed a threshold value Nth, or the case in which the motor current value I the measurement unit 50 measured is equal or exceed a threshold value Ith. The full open position determination unit 522 supplies a full open position signal indicating that the sliding door 13 reaches the full open position to the rotational control unit 54 in case of determining that the sliding door 13 reaches the full open position.

When the full open position signal is supplied from the full open position determination unit 522, the rotational control unit 54 supplies a regenerating brake signal to the driver circuit 51 for instructing the electric motor 21 to conduct a regenerating brake operation. The regenerating brake operation is an operation to generate a regenerating brake force to the electric motor 21. The regenerating brake signal is PWM instruction signal which is the drive signal G4 to G6 (or the drive signal G1 to G3) with duty ratio (Duty) of 100%. Therefore, upon the regenerating brake signal being supplied from the rotational control unit 54, the driver circuit 51 short-circuits the input terminals 22u, 22v and 22w provided respectively in the rotor coils 21u, 21v and 21w by turning on the switching element 42d, the switching element 42e and the switching element 42f on the lower stage. That is to say, turning the switching element 42a, the switching element 42b and the switching element 42c on the upper stage (upper arm) off while turning the switching element 42*d*, the switching element 42*e* and the switching element 42*f* on the lower stage (lower arm) off. In addition, the rotational control unit 54 stops supplying the regenerating brake signal after the predetermined time T passes from when the regenerating brake signal is supplied to the driver circuit 51. In this way, the driver circuit 51 turns off the switching element 42*d*, the switching element 42*e* and the switching element 42*f* on the lower stage (lower arm). And accordingly, all the switching elements 42*a* to 42*f* are turned off, and the operation of regenerating brake is stopped.

Accordingly, when the sliding door 13 reaches the full open position, the motor control device 41 generates the regenerating brake force to the electric motor 21 and weakens a force to cause the sliding door 13 travel forward in the vehicle traveling direction (repelling force), generated by the tension to the cable 23 or elastic deformation of the stopper rubber 62 or the like. Thus, it is possible to reduce rattling of the sliding door 13.

However, during the regenerating brake operation is executed, when canceling condition to cancel the closing operation is fulfilled, the motor control device 41 stops the regenerating brake operation. Canceling condition, for example, is a case where an instruction signal to instructing to close the sliding door 13 is obtained as the handgrip 45 is operated towards closing side by an operator such as a passenger or the like.

Hereinafter, operations for generating the regenerating braking force by the motor control device 41 in the present embodiment will be described with reference to the FIG. 6.

Figure 6:
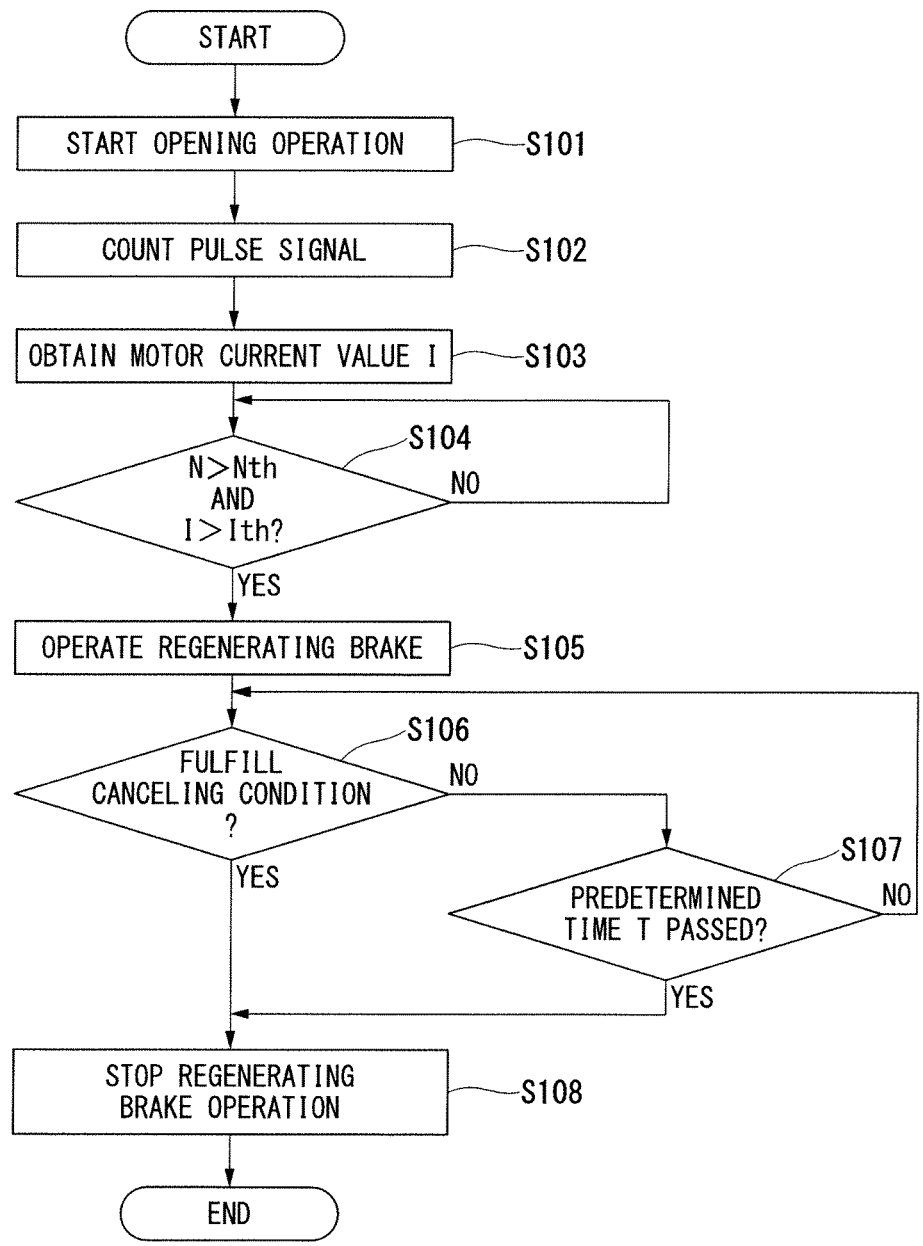
FIG. 6 is an explanatory diagram of an operation process flow of the motor control device to generate a regenerating brake force according to the present embodiment.

FIG. 6 is an explanatory diagram of an operation process flow of the motor control device 41 to generate the regenerating brake force according to the present embodiment.

The handgrip 45 supplies an instruction to instruct to open the sliding door 13 to the motor control device 41 by being operated towards the opening side by an operator such as a passenger or the like. When being supplied with the instruction to instruct to open the sliding door 13, the motor control device 41 conducts the forward rotation control. In this way, the opening operation of the sliding door 13 is conducted (Step S101).

When the opening operation of the sliding door 13 is started, the counter 521 counts the number of pulse of the pulse signal supplied from the rotation angle sensor 48 (Step S102).

The full open position determination unit 522 obtains the count value N which the counter 521 counted and the motor current value I which the measurement unit 50 measured by every certain cycle (Step S103).

The full open position determination unit 522 determines that the sliding door 13 reaches the full open position in a case where the count value N of the counter 521 is equal or exceed the threshold value Nth and the motor current value I the measurement unit 50 measured is equal or exceed the threshold value Ith (Step S104). In other words, the full open position determination unit 522 detects that the sliding door 13 abuts with the stopper rubber 62. Accordingly, the sliding door 13 travels through the full open lock position and reaches the full open position. In this situation, the striker 72 is engaged with the engagement groove provided at the leading end of the hook arm 71 of the sliding door 13.

In a case where the full open position determination unit 522 determines that the sliding door 13 reaches the full open positon, the full open position determination unit 522 supplies the full open position signal to the rotational control unit 54 indicating that the sliding door 13 reaches the full open positon. When the full open position signal is supplied from the full open position determination unit 522, the rotational control unit 54 supplies the regenerating brake signal to the driver circuit 51 instructing the electric motor 21 to conduct the regenerating brake operation. When the regenerating brake signal is supplied from rotational control unit 54, the driver circuit 51 executes the regenerating brake operation to the electric motor 21 by turning on the switching element 42*d*, the switching element 42*e* and the switching element 42*f* on the lower stage (Step S105).

The motor control device 41 determines whether or not the canceling condition is fulfilled (Step S106). For example, motor control device 41 determines the canceling condition is fulfilled when an instruction signal to close the sliding door is received as being operated towards the closing side by an operator such as a passenger or the like. When the motor control device 41 determines that the canceling condition is fulfilled, the motor control device 41 stops the regenerating brake operation (Step S108).

When an instruction signal to close the sliding door is received as being operated towards the closing side by an operator such as a passenger or the like, in a case where the motor control device 41 determines that the canceling condition is not fulfilled, the motor control device 41 determines whether or not the predetermined time T has passed (Step S107). In a case where the motor control device 41 determines that the predetermined time T has passed, the motor control device 41 stops the regenerating brake operation by stopping the supply of the regenerating brake signal (Step S108). That is to say, the motor control device 41 continues the regenerating brake operation until the predetermined time T passes. On the other hand, in a case where the motor control device 41 determines that the predetermined time has not passed the motor control device 41 returns to the process of Step 106.

As described above, the motor control device 41 in the present embodiment controls the rotation of the electric motor 21 which conducts opening/closing of the sliding door 13 provided in the vehicle 11. The motor control device 41 generates the regenerating brake force to the electric motor 21 until the predetermined time passes, in a case where it is determined that the sliding door 13 reaches the full open. In this way, it is possible to reduce the force to cause the sliding door 13 travel in the closing direction (forward in the vehicle traveling direction), the force being generated by the cable tension, flexure of the stopper rubber 62 or the like. Thus, it is possible to reduce rattling of the sliding door 13.

In the present embodiment described above, the full open position determination unit 522 determines that the sliding door 13 reaches the full open position in a case where the count value N of the counter 521 is equal or exceed the threshold value Nth, and the motor current value I the measurement unit 50 measured is equal or exceed the threshold value Ith, but not limited to what is described above. For example, the full open position determination unit 522 may determine that the sliding door 13 reaches the full open position in a case where the traveling speed of the sliding door 13 calculated based a duration to detect the pulse signal, that is, the cycle of the pulse signal is less than a predetermined threshold value (a third threshold value). This is based on that the traveling speed of the sliding door 13 decreases by abutting with the stopper rubber 62.

The control unit 52 in the aspect of the present embodiment described above may be possibly configured to be realized by a computer. In such a case, it may be possibly configured to realize this function by way of causing a computer system to read out and execute a computer program to realize this function recorded in a computer-readable recording media. "The computer system" here in this context includes an operating system and such peripherals as hardware. "The computer-readable recording media" refers to a recording device such as a movable media like a flexible disk, an optical disk, a ROM, a CD-ROM, and such as a hard disk embedded in the computer system. Also, "the computer-readable recording media" may include what dynamically retains a program for a short time such as a communication wire in case of transmitting a program via a network like Internet, etc. or a communication line like a telephone line. Also, "the computer-readable recording media" may include what retains a program for a certain period of time such as a volatile memory inside the computer system used as a server or a client in the case described above. Also the program described above may be for realizing a part of the functions described above, may be what realizes the functions described above in combination with a program already recorded in the computer system, and may be what realizes the functions described above by using a programmable logic device such as FPGA (Field Programmable Gate Array).

The embodiment of the present invention is described above referring to the diagrams, however, actual configuration is not limited to the above-described embodiment. And a variety of modification and substitution can be added without departing from the scope of the invention.

The invention claimed is:

1. A motor control device to control rotation of an electric motor configured to conduct opening/closing of an opening/closing body provided in a vehicle, the motor control device, comprising:
    a control unit configured to generate a regenerating brake force to the electric motor until a predetermined time passes, in a case where it is determined that the opening/closing body reaches a full open position; and
    a full open position determination unit configured to determine whether or not the opening/closing body reaches the full open position based on pulse signal output from a rotation angle sensor in accordance with rotation of the electric motor,
    wherein the full open position determination unit is configured to determine that the opening/closing body reaches the full open position in a case where the pulse signal is equal or exceed a first threshold value, and a current value of a current which flows in the electric motor is equal or exceed a second threshold value.

2. The motor control device according to claim 1,
    wherein the full open position determination unit is configured to determine that the opening/closing body reaches the full open position in a case where the pulse signal is equal or exceed a first threshold value.

3. A motor control device to control rotation of an electric motor configured to conduct opening/closing of an opening/closing body provided in a vehicle, the motor control device, comprising:
    a control unit configured to generate a regenerating brake force to the electric motor until a predetermined time passes, in a case where it is determined that the opening/closing body reaches a full open position; and
    a full open position determination unit configured to determine whether or not the opening/closing body reaches the full open position based on pulse signal output from a rotation angle sensor in accordance with rotation of the electric motor,
    wherein the full open position determination unit is configured to:
    calculate a traveling speed of the opening/closing body based on the pulse signal;
    determine whether or not the calculated traveling speed of the opening/closing body is less than a third threshold value; and
    determine that the opening/closing body reaches the full open position in a case where the calculated traveling speed of the opening/closing body is less than the third threshold value.

* * * * *